United States Patent
Newald et al.

(10) Patent No.: US 12,278,710 B2
(45) Date of Patent: Apr. 15, 2025

(54) METHOD FOR OPERATING A COMMUNICATION SYSTEM, COMMUNICATION SYSTEM, AND COMPUTING SYSTEM

(71) Applicant: Robert Bosch GmbH, Stuttgart (DE)

(72) Inventors: Josef Newald, Stuttgart (DE); Lambros Dalakuras, Leonberg (DE); Thomas Hogenmueller, Hemmingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 556 days.

(21) Appl. No.: 17/674,109

(22) Filed: Feb. 17, 2022

(65) Prior Publication Data

US 2022/0271970 A1 Aug. 25, 2022

(30) Foreign Application Priority Data

Feb. 24, 2021 (DE) .................... 10 2021 104 422.7

(51) Int. Cl.
*H04L 12/40* (2006.01)
*H04L 67/12* (2022.01)

(52) U.S. Cl.
CPC .. *H04L 12/40032* (2013.01); *H04L 12/40039* (2013.01); *H04L 67/12* (2013.01); *H04L 2012/40234* (2013.01)

(58) Field of Classification Search
CPC ......... H04L 12/40032; H04L 12/40039; H04L 67/12; H04L 2012/40234; H04L 12/403; H04L 2012/40273; H04L 12/44; H04L 12/40006
See application file for complete search history.

(56) References Cited

U.S. PATENT DOCUMENTS

| 2013/0064102 | A1* | 3/2013 | Chang ..................... H04L 49/70 370/255 |
| 2014/0003287 | A1* | 1/2014 | Frantz ................... H04L 47/741 370/254 |
| 2016/0164739 | A1* | 6/2016 | Skalecki ................. H04L 41/40 370/389 |
| 2020/0329072 | A1* | 10/2020 | Dubois ................... H04L 63/20 |
| 2023/0025735 | A1* | 1/2023 | Acharya ................. H04L 67/12 |

\* cited by examiner

*Primary Examiner* — Chi H Pham
*Assistant Examiner* — Raul Rivas
(74) *Attorney, Agent, or Firm* — NORTON ROSE FULBRIGHT US LLP; Gerard A. Messina

(57) ABSTRACT

A method for operating a communications network that includes a computing system, at least one intermediate control unit, and at least one execution unit for each intermediate control unit. The at least one intermediate control unit is communicatively connected to the computing system using a first communication system. Each of the at least one execution unit is communicatively connected to the associated intermediate control unit using a second communication system, which is a master-slave communication system, and used as a slave. A message configuration table for each second communication system is stored in the computing system, the message configuration table indicating a temporal sequence of data to be transmitted on the second communication system in question. For a communication with one of the execution units, data are sent from the computing system, via the associated intermediate control unit, to the execution unit according to the associated message configuration table.

15 Claims, 6 Drawing Sheets

METHOD FOR OPERATING A COMMUNICATION SYSTEM, COMMUNICATION SYSTEM, AND COMPUTING SYSTEM

FIELD

The present invention relates to a method for operating a communication system, to a communication system, and to a method for configuring a communication system.

BACKGROUND INFORMATION

In modern vehicles, there are various functions that are implemented by individual control units, and sensors and actuators connected thereto. A communicative connection of sensors and actuators to a control unit may take place with the aid of a LIN bus, for example. Control units may in turn be connected to one another in a data-transmitting or communicative manner in order to exchange data or information. The entirety of control units, sensors, and actuators as well as possibly other components such as communication links in particular is also referred to as the vehicle electrical system or vehicle data network, and its design and configuration are also referred to as E/E architecture.

SUMMARY

According to the present invention, a method for operating a communication system, a communication system, and a method for configuring a communication system, are provided. Advantageous embodiments of the present invention are disclosed herein.

The present invention relates to a communications network such as a vehicle electrical system or the E/E architecture in a vehicle, for example, and in particular to the communication between various units in this communications network or vehicle electrical system. One particular aspect of the present invention involves use of the LIN bus or some other master-slave communication system, i.e., a communication system that includes a communication master user and one or more communication slave users, and incorporation thereof.

Driven by cost optimization, increasing complexity of the electronics in the vehicle, and new options due to technical progress, efforts are being made, in particular by vehicle manufacturers, to optimize the E/E architecture. In order on the one hand to save costs by simplifying the wiring harness, and on the other hand to increase the flexibility and scalability by concentrating or centralizing software on so-called vehicle central computers, the use of a so-called zonal E/E architecture or zone architecture comes into consideration. In zonal E/E architecture, for example sensors, actuators, and also other units may be connected, corresponding to their geometric position in the vehicle, to one or more vehicle central computers via so-called zone control units. The zone control units function in particular as energy and data distributors, the actual logic or function being executed or computed, at least to the extent possible, on the vehicle central computer.

The centralization of the software (with logic and function) is typically accompanied by the use of more powerful processing units on the vehicle central computer; the current, commonly used microcontroller (μC)-based systems are expanded in this device class with microprocessors (μP). The operating systems (POSIX-based operating systems, for example) running thereon enable a so-called service-oriented architecture (SOA) that allows efficient and rapid development of functions.

In the mentioned zone architecture, three layers are provided: a computational layer, a zonal layer, and an execution or embedded layer. The vehicle central computer is provided in the computational layer. It is also possible to use multiple such vehicle central computers, which are then correspondingly associated with all of the computational layers. Typically and also preferably, the vehicle central computer is connected (in particular wirelessly) to a vehicle-external or vehicle-remote processing unit such as a remote computer system or a server ("cloud"), via which various functions or services or also software updates may be provided. With multiple vehicle central computers, connecting one of them to the vehicle-remote processing unit may be sufficient. This vehicle-remote processing unit may then likewise be associated with the computational layer.

Zone control units (in the generic sense) are provided in the zonal layer, typically multiple zone control units being present, although the zone architecture is in principle also usable in the case where there is only one zone control unit. Execution units (in the generic sense) are provided in the execution layer, typically multiple execution units being present for each zone control unit, although the zone architecture is in principle also usable in the case where there is only one execution unit overall, or one execution unit for each zone control unit.

The zone control units, which may be relatively simple computer systems or processing units as explained in greater detail below, are used in particular for the geometric or spatial distribution in the vehicle. For example, four zone control units may be provided, one each for the front, rear, left, and right sides of the vehicle (in this regard, also see the figures together with the description of the figures). Execution units are understood in particular to mean sensors, actuators, "intelligent" mechatronics or mechatronic units (so-called smart components, which are understood herein to mean mechanical units having their own computational logic system or controller, for example a radiator mechatronic system made up of a fan motor, fan output stage, and fan microcontroller, or for example the mechatronics of a transmission that controls shifting operations) and (smart) electronic control units (ECUs), i.e., conventional control units, and other mechatronic units that are situated on the lowest layer and are responsible for (directly) carrying out actions or measurements. Due to the association of the execution units with one zone control unit in each case, the individual execution units may also be correspondingly associated with one zone such as "front" or "rear." For example, all control units situated in the engine compartment may be associated with the "front" zone.

The zone control units are in each case communicatively connected to the vehicle central computer (or the computational layer) with the aid of a first communication system. For example, Ethernet or some other broadband communication system comes into consideration here as the first communication system. In the case of multiple vehicle central computers, each zone control unit may be connected to (only) one of these vehicle central computers. Each execution unit is communicatively connected, indirectly or directly, to the zone control unit associated with it via a second communication system, such as a communication bus. For example, a CAN bus or LIN bus comes into consideration here as the second communication system or communication bus. Various execution units may be connected to the same zone control unit, or also possibly via various communication buses. Individual execution units may be directly connected to the associated zone control unit, this applying in particular for control units or smart or intelligent sensors and actuators. However, an execution unit may likewise be indirectly connected to the zone control unit, in that case via such a control unit, for example. This applies in particular for simple sensors and actuators. For all communication systems, a communicative connection is understood in particular to mean that data or information may be exchanged, in particular digitally (but also possibly in an analog manner for simple sensors).

The present invention is now concerned in particular with the second communication system, provided that it is based on master-slave communication, in particular the LIN bus, which may be used in the zone architecture. The communication master user specifies the temporal sequence of the communication, in particular by sending telegrams (or frames) that are filled with data by the communication slave users according to certain configuration specifications, or to which the communication slave users append their data.

The present invention is described below in particular with reference to the LIN bus; however, the principle may also be transferred to other systems based on master-slave communication. LIN stands for "Local Interconnect Network," and is a serial communication system for the interconnection of sensors and actuators, for example, i.e., a field bus. Typical application examples are, for example, the interconnection inside the door or the seat of a motor vehicle.

In principle, one or more LIN buses may be connected to a control unit, it being possible once again for one or more units such as actuators and sensors (or execution units in general, as in the above example) to be connected to each of the LIN buses. These units are used as slaves, while the control unit is used as a master, a dedicated master being provided in the control unit for each LIN bus. A connection between the individual LIN buses or other buses (such as CAN, for example), in any case with conventional architecture, may be established on the control unit or between various control units by use of gateway software.

As mentioned at the outset, multiple LIN buses are typically present in a vehicle on different control units, and are connected via a gateway. If the operating systems of the control units are temporally synchronized, the schedules of the LIN clusters may thus also be coordinated. The schedules are configuration tables for messages or communications to be sent or received (also referred to below as message configuration tables), which are present on the control unit (master) in question, and according to which the master coordinates the communication on the LIN bus. Within a frame, the master first sends a header by specifying, among other things, which slave(s) is/are, for example, to send a message and which slave(s) is/are to receive a message. After the header, the data may then be sent by the slave in a response. The master itself may also send and receive data.

In addition, in particular for the LIN bus, a normal (or "wake") operating mode and a sleep mode are provided as operating modes. The communication takes place in the normal operating mode. However, the master may place the slaves in the sleep mode (via a certain message); it is likewise typically provided to transfer the units into the sleep mode after a certain period of inactivity on the LIN bus. The master and also each slave may transfer the LIN bus from the sleep mode into the normal operating mode (via a "wakeup signal," also referred to as activation). The units are generally subsequently initialized, and are ready for the communication. The specific procedure for the change between operating modes may be stipulated in a configuration table that is present on the master or the control unit in question. Multiple LIN buses of a control unit may also be combined in such an operating mode configuration table. A configuration table for a certain operating mode is referred to below as an operating mode configuration table.

In the above-mentioned zone architecture, a communication via the LIN bus is to be incorporated in the most optimal manner possible. The mentioned vehicle central computer here may represent a gateway, for example, over which multiple LIN buses may be connected. Although a vehicle central computer provides good or high computing power, it also has high latencies, and generally only limited real-time capability. Response times here are typically approximately 100 ms, for example, which corresponds approximately to one cycle of a LIN schedule (for example, 10 slots (or frames) at 10 ms each). Although the zone control units have lower computing power, they do have good real-time capability with response times between approximately 1 ms and 10 ms, for example, which corresponds approximately to one slot of a LIN schedule. Furthermore, zone control units generally have many communication interfaces with low and average bandwidths (for connection to the downstream execution units such as sensors and actuators), whereas vehicle central computers usually have few communication interfaces with high bandwidth, for example Ethernet.

If the execution units to be connected via the LIN bus are now connected to the zone control units, and the zone control units, as previously, include the message configuration tables and operating mode configuration tables and act as the masters, only few real-time requirements are to be imposed on the vehicle central computers. Although this does basically correspond to the properties of vehicle central computers, it is disadvantageous that the configuration of the individual LIN buses must take place individually in the zones, which is relatively complex. It would also be possible to connect the LIN buses directly to the vehicle central computer, optionally with simple looping through of the lines by the zone control units. However, it is disadvantageous that the vehicle central computers simply do not have particularly good real-time capability, which, however, is important for LIN.

Against this background, within the scope of the present invention it is now proposed that, for the zone architecture explained above including a vehicle central computer, zone control units, and execution units connected thereto via master-slave communication systems, the message configuration table for the master-slave communication system in question is stored in the vehicle central computer; for a communication with the execution unit, data concerning the zone control unit are sent from the vehicle central computer to the execution unit according to the message configuration table. A message configuration table indicates when and/or how often which messages or communications (header/response) are to be sent by which user (master/slave). The message configuration table thus indicates a temporal sequence of data to be transmitted on the second communication system in question (LIN, for example). These times must be adhered to by the second communication system, corresponding to the protocol specification. The vehicle central computer may, and in particular must, distribute one or more messages and optionally their configuration in a timely manner before they are needed by the second communication system.

In this way, the high computing power of the vehicle central computers is combined with the short latency of the zone control units. A vehicle central computer may thus utilize the extensive communication interfaces, i.e., in particular a plurality of master-slave communication systems such as LIN buses at the zone control units, but without being subject to their latency requirements. The zone control units, in turn, require no extensive information or application software. The functions of the master for all master-slave communication systems, which are connected to a vehicle central computer via possibly multiple zone control units, are thus taken over by the vehicle central computer, at least as far as the sending and receipt of data are concerned.

Operating mode configuration tables (or also referred to only as operating mode configuration) may preferably likewise be stored on the vehicle central computer, as the result of which the vehicle central computer acquires full control, i.e., may also initiate the sleep mode of the LIN buses, for example. However, the operating mode configuration tables may also continue to be situated on the zone control units. In principle, however, a simple wakeup configuration on the zone control units is sufficient here to allow the wakeup to be carried out by slave control units (i.e., in particular execution units).

A request for the idle state generally takes place either via a message or via a bus idle state (of typically more than 4 s). The bus is implicitly awakened by the master with each transmission message or reception message.

Users at the LIN bus (or in the second communication system) are activated by a defined wakeup message. If the operating mode configuration is situated in the zone control unit, the master in the zone control unit checks the wakeup authorization by querying the bus users thus authorized (at the second communication system), since at this point in time a connection to the vehicle central computer is not yet ensured. As soon as the connection to the vehicle central computer is established, the communications (or messages) of this check are also relayed there. The advantage of this method is the lower quiescent current requirement, since the vehicle central computer does not have to be activated for checking the wakeup authorization. If the operating mode configuration is situated in the vehicle central computer, the vehicle central computer is first activated, and checks the wakeup authorization by sending or receiving messages. The disadvantage is the longer wakeup time and the higher quiescent current requirement, in particular in the event of disturbances; however, the advantage is the simple configuration in the zone control unit. The operating mode configuration or the operating mode configuration table thus specifies wakeup authorizations and/or their checking for the second communication system (or the LIN bus).

For this purpose, data to be sent from the vehicle central computer to an execution unit are transferred, in particular together with a transmission time, to the zone control unit in question, and are sent by same at the transmission time as transmission data to the execution unit. Such transmission data may include, for example, a message header or also this header together with useful data (if the master itself also intends to send data in this case). Data sent from the execution unit (as slave) are preferably received by the zone control unit and transferred as reception data, together with a reception time, to the vehicle central computer. Due to the message configuration table that is present in the vehicle central computer, the message configuration table may also appropriately associate and process the data obtained in this way. From the viewpoint of the vehicle central computer, it thus manages a global master-slave communication system in the manner of a large virtual LIN bus.

Although this type of incorporation of master-slave communication systems is particularly well suited for the zone architecture in vehicles, on the basis of which the present invention has been explained above, this procedure may likewise be used for other communications networks in which an execution unit, as slave, is connected to a control unit or intermediate control unit, which in turn is connected via a communication system such as Ethernet to a higher-order computing system (preferably having high computing power, which then corresponds in particular to the vehicle central computer). Here as well, simple scaling using multiple control units (in the sense of the zone control units), and at that location multiple master-slave communication systems in each case, each with one or more execution units, may be achieved.

Apart from a method for operating such a communications network, in particular as a vehicle electrical system in a vehicle, the present invention also relates to such a communications network, to a computing system for use in such a communications network, and to a method for configuring such a communications network. For further embodiments and advantages of the communication network, computing system, and method for configuring, to avoid repetitions reference is made to the above statements, which correspondingly apply here.

Further advantages and embodiments of the present invention result from the description and the figures.

The present invention is schematically illustrated in the figures based on exemplary embodiments, and is described below with reference to the figures.

DETAILED DESCRIPTION OF EXAMPLE EMBODIMENTS

Figure 1:
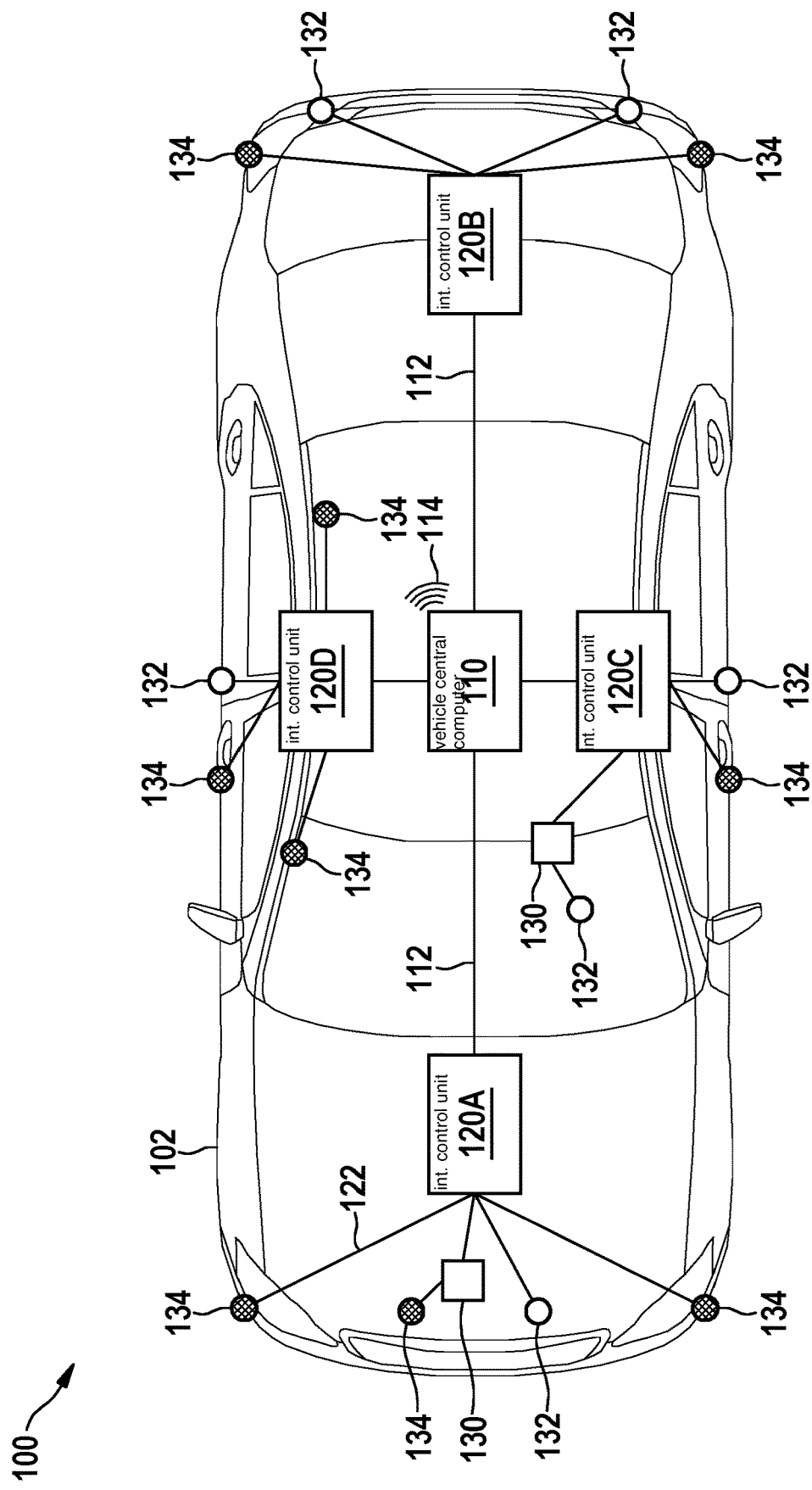
FIG. 1 schematically shows a vehicle electrical system in a vehicle for explaining the present invention.

FIG. 1 schematically illustrates a vehicle electrical system 100 in a vehicle 102 for explaining the present invention, on the basis of which the E/E architecture and the distribution of the individual units or components of the vehicle electrical system are to be explained. Vehicle electrical system 100 includes by way of example a vehicle central computer 110, four intermediate control units 120A, 120B, 120C, 120D that are designed (or used) as zone control units, and multiple execution units, which in the present case include control units 120, intelligent mechatronic units 132, and actuators and sensors 134 (a distinction is not made here between actuators and sensors).

Zone control units 120A, 120B, 120C, 120D are respectively associated with a "front," "rear," "left," and "right" zone by way of example, and in each case are communicatively connected to vehicle central computer 110 via a first communication system 112, for example Ethernet, which allows a communication of each of the zone control units with vehicle central computer 110. In addition, vehicle central computer 110 includes a wireless communication link 114 (or a corresponding communication module) to allow communication with a vehicle-remote processing unit ("cloud"), for example, as explained in greater detail below.

Execution units 130, 132, 134 are each associated with one of the zone control units, and are communicatively connected, indirectly or directly, to the zone control unit via a second communication link 122 such as a CAN bus or LIN bus. For example, control unit 130 associated with zone control unit 120A is directly connected to the zone control unit, whereas one of sensors/actuators 134 is indirectly connected, namely, via control unit 130; this sensor/actuator 134 is in particular directly connected to control unit 130. Other sensors/actuators 134 are, for example, also directly connected to the zone control unit, and the same applies for intelligent mechatronic units 132.

Second communication systems 112 for connecting the execution units to the zone control units or optionally to one another do not necessarily all have to be identical; a difference is possible, depending on the type of execution unit. Thus, simpler sensors are connected only via LIN, for example, and slightly more complex control units are connected via CAN, for example. However, the zone control units have corresponding interfaces.

The specific type or functionality of execution units 130, 132, 134 is not important for the present invention; for example, execution units 130, 132, 134, which are associated with zone control unit 120A and thus with the "front" zone, include, for example, lights or actuators for windshield wipers or the like. The same applies for zone control unit 120B or the "rear" zone. The execution units associated with zone control units 120C, 120D or the respective "left" and "right" zones may be, for example, buttons and actuators for window lifts. At this point it is noted once more that this vehicle electrical system is strictly an example intended for explanation of the present invention.

However, it is clear from the vehicle electrical system 100 shown that the zone control units make possible a targeted association or division of the individual execution units according to geometric zones if there is only one vehicle central computer (or possibly a few vehicle central computers), as the result of which the entire (cumulative) length of cables for the vehicle electrical system may sometimes be reduced significantly compared to conventional E/E architecture.

At this point it is noted that this pertains in particular to the communication systems or communication media. It is understood that an energy or power supply, not further discussed here, is also necessary for the individual units.

Figure 2:
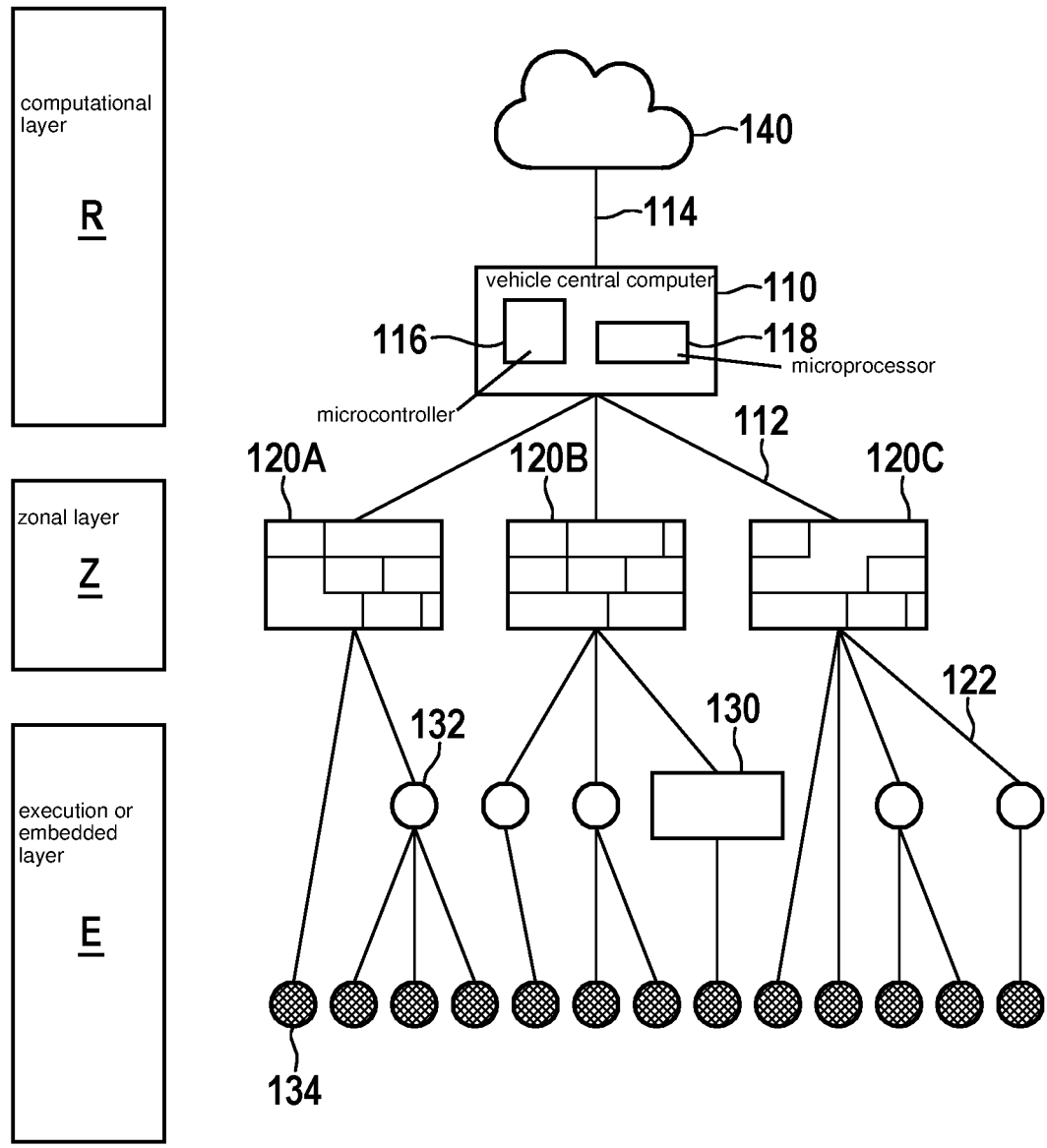
FIG. 2 schematically shows a zone architecture of a vehicle electrical system for explaining the present invention.

FIG. 2 schematically illustrates a zone architecture of a vehicle electrical system for further explaining the present invention. The vehicle electrical system shown here is comparable to vehicle electrical system 100 from FIG. 1, but with a slightly changed number of individual units; however, the designations correspond to those from FIG. 1. Thus, for example, only the three zone control units 120A, 120B, 120C with which execution units are associated in each case, and whose number possibly differs from that from FIG. 1, are shown. However, this has no effect on the functional principle of the present invention.

As mentioned above, such a zone architecture has three layers with which the individual units are associated. Vehicle central computer 110, shown here with a microcontroller 116 and a microprocessor 118 by way of example, is associated with computational layer R. Likewise shown is a vehicle-remote processing unit 140 (which is, for example, a central server or high-performance computer that is situated remotely from the vehicle and that provides memory and computing power), to which the vehicle central computer is connected via wireless communication link 114. Vehicle-remote processing unit 140 is likewise associated with computational layer R.

Zone control units 120A, 120B, 120C are associated with zonal layer Z, and execution units 130, 132, 134 are associated with execution or embedded layer E. Within execution layer E, control units 130 and intelligent mechatronic units 132 are situated in an intermediate stage above sensors/actuators 134, which, however, has no effect on the functional principle of the present invention.

The communication systems and the communicative connection, explained above with reference to FIG. 1, result in the communication concept that a communication between an execution unit (in execution layer E) and the vehicle central computer (in computational layer R) always or only takes place via a zone control unit (in zonal layer Z). In turn, a communication between two zone control units always or only takes place via computational layer R. The zone control units themselves are thus used only as a type of gateway or tunnel, for example. Each zone control unit re-outputs incoming data with the content unchanged, or at best a formal adaptation to the other communication system, for example from LIN to Ethernet or from Ethernet to CAN, or encapsulation is carried out.

Within the scope of the present invention, in particular those execution units 130, 132, 134 that are connected to a zone control unit with the aid of a master-slave communication system, thus, LIN in the present case, or with the aid of a LIN bus, are now of interest. As mentioned above, the concept may also be applied to other communications networks in which one or more execution units are connected via LIN (or a comparable system) to a control unit, which in turn is then connected to a higher-order computing system.

Figure 3:
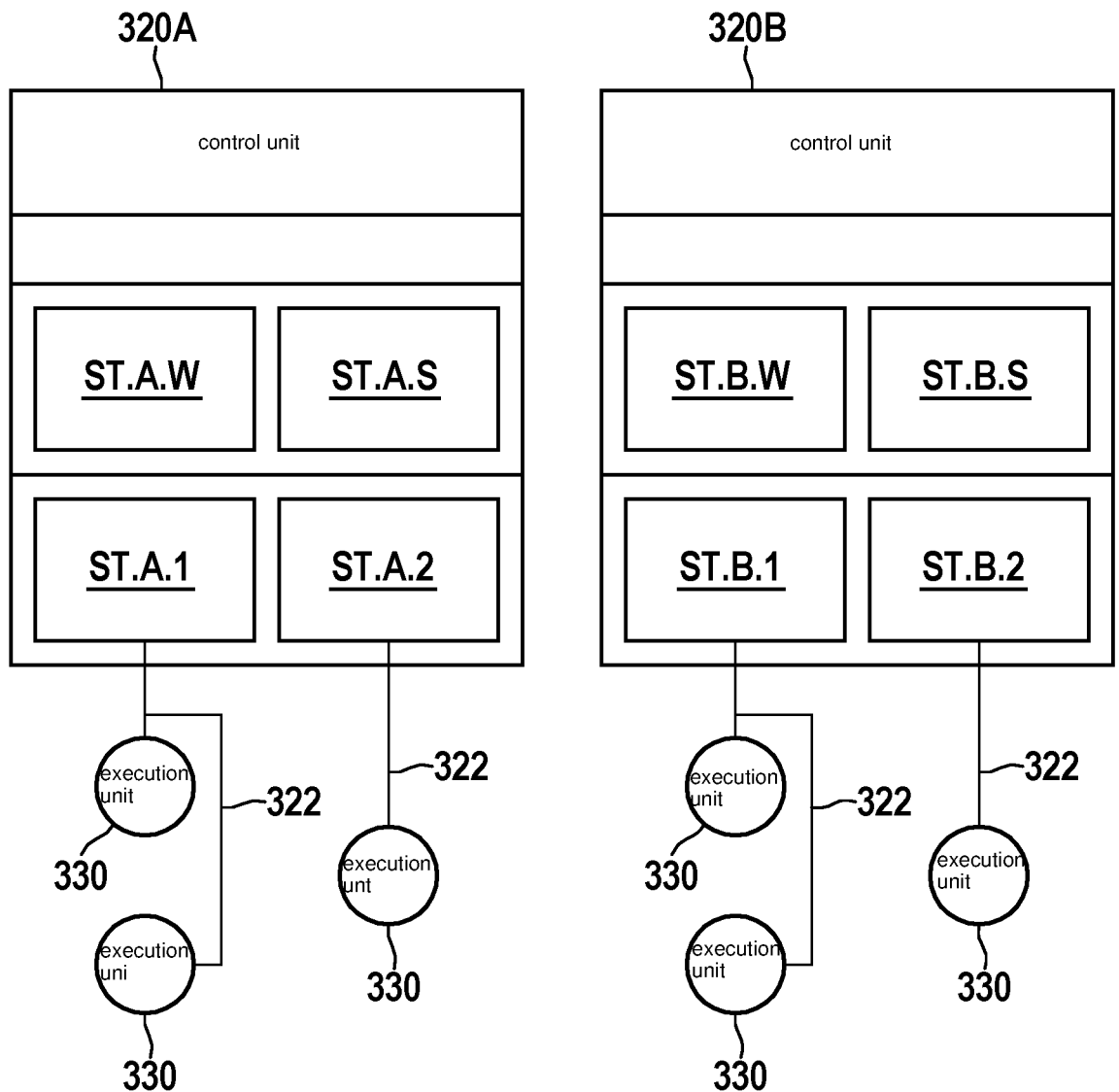
FIG. 3 schematically shows control units not according to the present invention for explaining the background of the present invention.

FIG. 3 schematically shows control units 320A, 320B not according to the present invention for explaining the background of the present invention. A conventional connection of units to control units via LIN as a master-slave communication system is explained.

As an example, three execution units 330 are connected, via two LIN buses 322, to each of the two control units, which may function in a vehicle as domain control units, for example. By way of example, for each control unit, two execution units are connected to one of the two LIN buses, and for each control unit, one execution unit is connected to the other of the two LIN buses. It is understood that this is strictly an example and is used only for explanation. Execution units 330 may be, for example, (also various) sensors and actuators, as explained above (see execution units 130, 132, 134), provided that they are connected with the aid of LIN. These execution units are connected as slaves to the LIN bus in question, and control units 320A, 320B are used in each case as a master.

Correspondingly, message configuration tables (scheduling tables) ST.A.1 and ST.A.2 are stored in control unit 320A, and message configuration tables ST.B.1 and ST.B.2 are stored in control unit 320B. For each LIN bus connected to the control unit, at least one such message configuration table is typically present to allow the communication to be controlled. The message configuration table indicates a temporal sequence of data to be transmitted on the LIN bus in question, i.e., for example when a header is always to be transmitted, when a response should or may be sent by which slave, etc. In addition, operating mode configuration tables (scheduling tables) for normal mode (wake) mode ST.A.W or ST.B.W and for sleep mode ST.A.S or ST.B.S are stored in each of the control units. For example, the actuation or waking up of the LIN bus may be controlled in this way. The operating mode configuration table indicates how and/or when the operating mode is changed or should be changed, i.e., for example when the master must send a wakeup command or how the wakeup authorization of the slaves is checked.

Within the scope of the present invention, an integration of the message configuration tables into a (powerful) computing system such as the vehicle central computer is now proposed, while, although the LIN buses are still connected to the control units, they are in turn connected to the vehicle central computer via Ethernet, for example.

Figure 4:
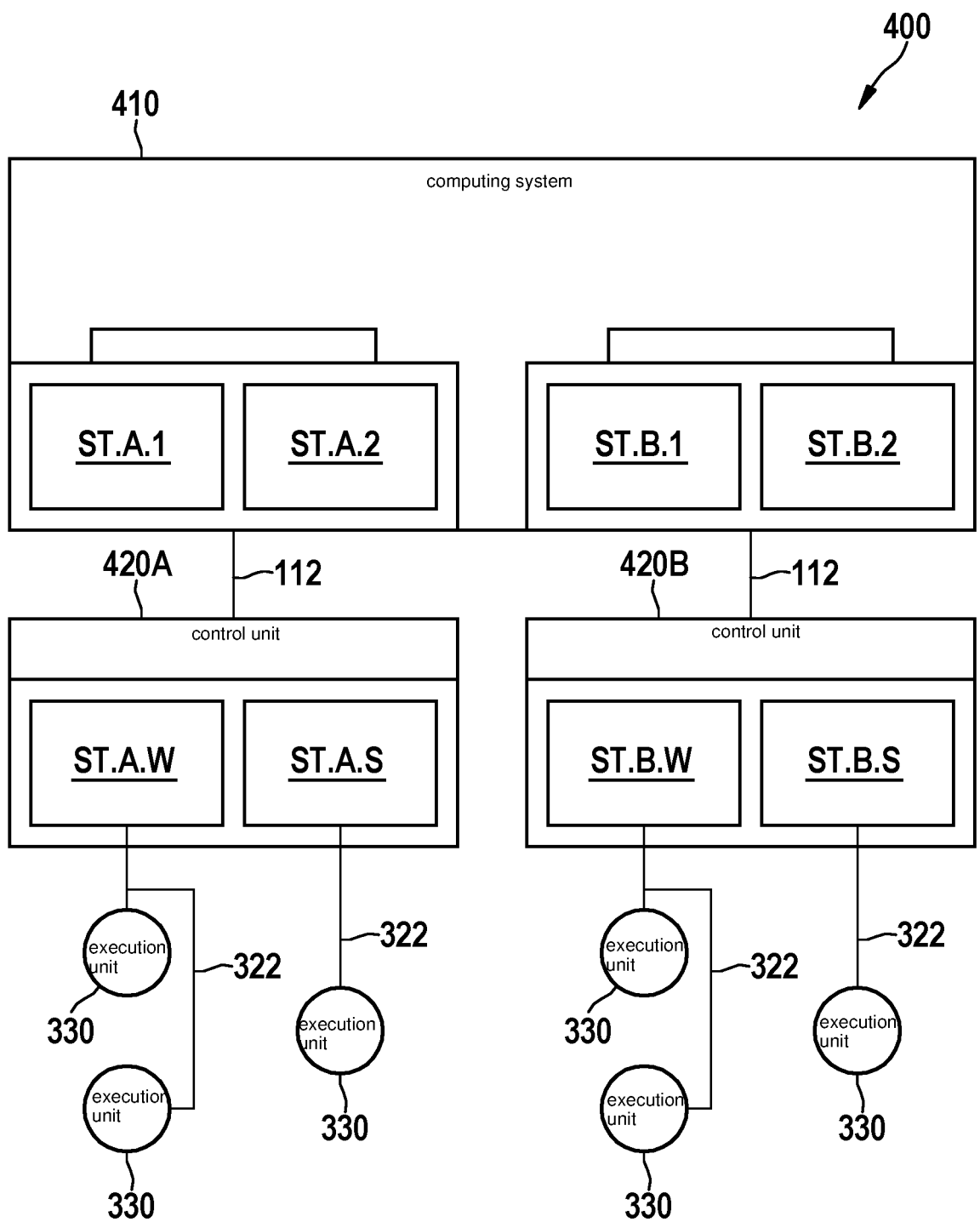
FIG. 4 schematically shows a communications network according to the present invention in one preferred specific embodiment.

FIG. 4 schematically illustrates a communications network 400 according to the present invention in one preferred specific embodiment. Computing system 410, which in the present case may be a vehicle central computer 110 according to FIG. 1, for example, is connected to two control units 420A, 420B (within the scope of the present invention, also referred to as intermediate control units) via a communication system 112 such as Ethernet. The control units may be zone control units according to FIG. 1, for example. In turn, execution units 330 are connected to these control units 420A, 420B with the aid of LIN buses 322 as master-slave communication systems, as already described with reference to FIG. 3. However, message configuration tables ST.A.1, ST.A.2, ST.B.1, and ST.B.2 are now stored in computing system 410, while only the operating mode configuration tables are still present in control units 420A, 420B, as also shown in FIG. 3.

The communication may thus be controlled from computing system 410 by initially sending necessary data to the control unit in question (via Ethernet, for example, the data may be packed in the payload for Ethernet), and in particular with a desired transmission time, for example, according to the associated message configuration table. The control unit then reads out these data and sends them at the predefined point in time via LIN, in particular the LIN bus in question. Correspondingly, a control unit may read out data via LIN, and may pack the data together with a reception time in the payload for Ethernet and send them to computing system 410.

Figure 5:
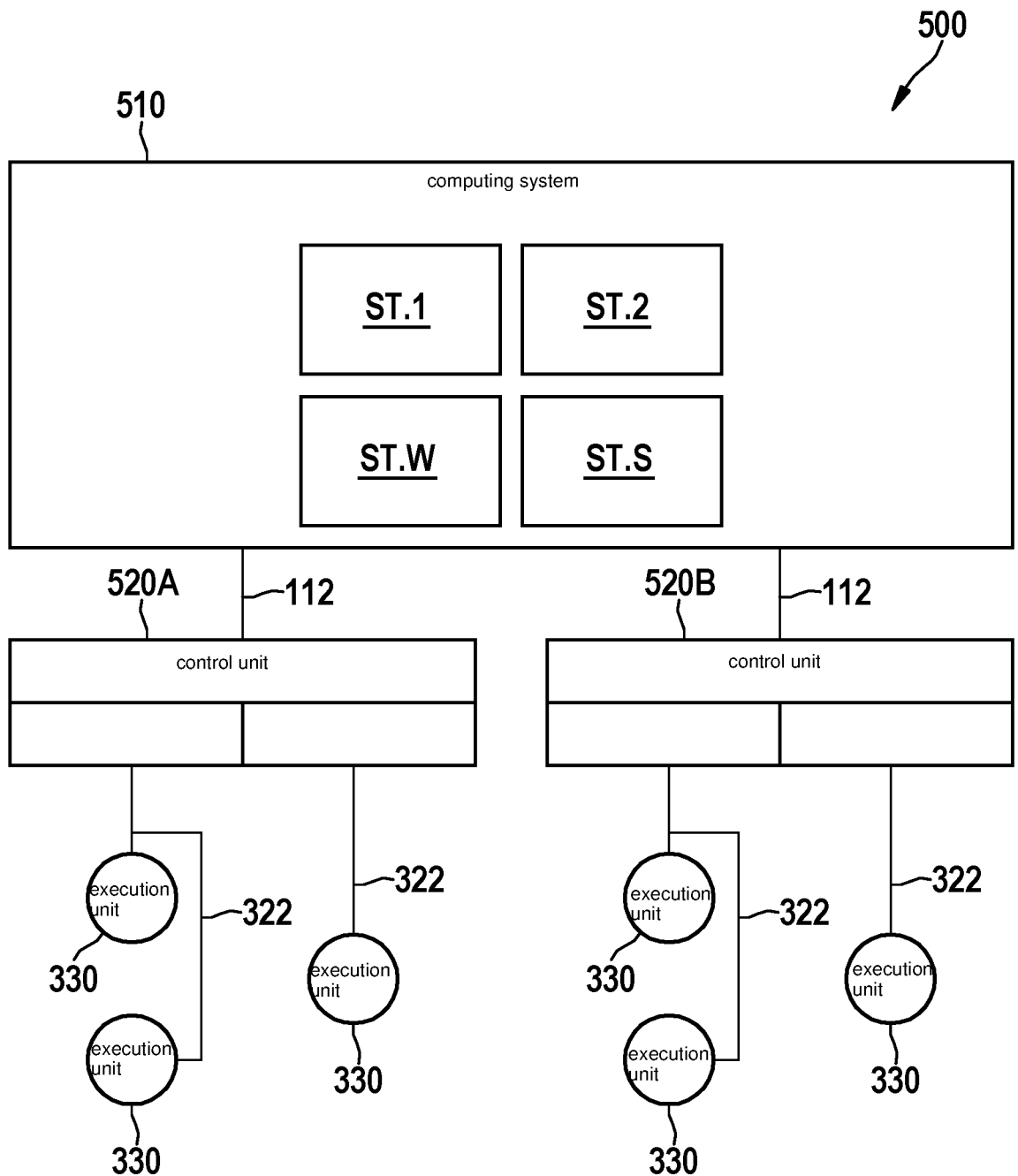
FIG. 5 schematically shows a communications network according to the present invention in a further preferred specific embodiment.

FIG. 5 schematically illustrates a communications network 500 according to the present invention in a further preferred specific embodiment. Computing system 510, which in the present case may be a vehicle central computer 110 according to FIG. 1, for example, is connected to two control units 520A, 520B via a communication system 112 such as Ethernet. The control units may be zone control units according to FIG. 1, for example. In turn, execution units 330 are connected to these control units 520A, 520B with the aid of LIN buses 322 as master-slave communication systems, as already described with reference to FIG. 3. However, the message configuration tables, of which only two, ST.1 and ST.2, are shown here by way of example, are now stored in computing system 510, the same as the operating mode configuration tables.

The communication may thus be controlled from computing system 510 by initially sending necessary data to the control unit in question (via Ethernet, for example, the data may be packed in the payload for Ethernet), and in particular together with a desired transmission time, for example, according to the associated message configuration table. The control unit then reads out these data and sends them at the predefined point in time via LIN, in particular the LIN bus in question. Correspondingly, a control unit may read out data via LIN, and may pack the data together with a reception time in the payload for Ethernet and send them to computing system 510.

Figure 6:
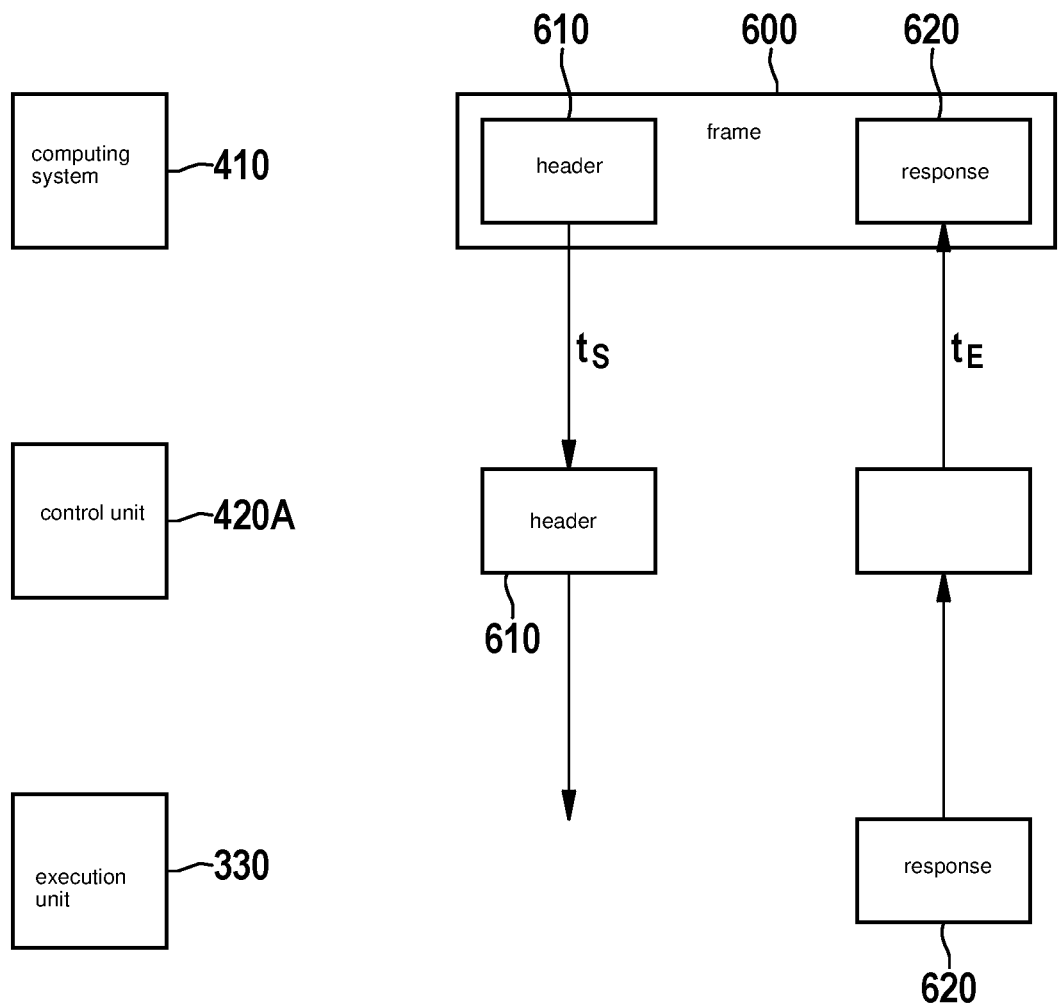
FIG. 6 schematically shows a sequence of a method according to the present invention in one preferred specific embodiment.

FIG. 6 schematically illustrates a sequence of a method according to the present invention in one preferred specific embodiment. For this purpose, first a frame 600 with a header 610 and a response 620 is shown, as used in LIN as a master-slave communication system.

Computing system 410 (which could also be computing system 510) initially sends header 610 (data to be sent) according to the message configuration table, at a desired transmission time $t_S$, to intermediate control unit 420A, which then sends them at transmission time $t_S$ (this may be a point in time), as master, to execution unit 330 in question as slave, via LIN. Execution unit 330, in turn, as slave may, for example, have to send an answer or response 620 according to received header 610. This response 620 is sent via LIN to intermediate control unit 420A, which makes note of reception point in time $t_E$ and transmits same, together with response 620 (data to be received), to computing system 410.

What is claimed is:

1. A method for operating a communications network that includes a computing system, at least one intermediate control unit, and at least one execution unit associated with each intermediate control unit, the at least one intermediate control unit being communicatively connected to the computing system using a first communication system, each of the at least one execution unit being communicatively connected to the associated intermediate control unit using an associated second communication system, which is a master-slave communication system, and used as a slave,
wherein a message configuration table for each second communication system is stored in the computing system, the message configuration table indicating a temporal sequence of data to be transmitted on the second communication system, the method comprising:
for a communication with an execution unit of the execution units, sending data from the computing system, via the associated intermediate control unit, to the execution unit using the associated second communication system according to the associated message configuration table for the associated second communication system,
wherein an operating mode configuration table for each of the at least one second communication system is stored in the associated intermediate control unit, the operating mode configuration table specifying wakeup authorizations for the second communication system and checking thereof.

2. The method as recited in claim 1, wherein the data to be sent from the computing system to the execution unit are transferred, together with a transmission time, to the associated intermediate control unit, and are sent by the computing system at the transmission time as transmission data to the execution unit.

3. The method as recited in claim 2, wherein the data are always transferred from the computing system for a predetermined number of frames, according to the associated message configuration table for the associate second communication system, to the associated intermediate control unit.

4. The method as recited in claim 1, wherein data that are sent from the execution unit are received by the associated intermediate control unit at a reception time, and as reception data are transferred, together with the reception time, to the computing system.

5. The method as recited in claim 1, wherein a LIN bus is used as the at least one second communication system.

6. The method as recited in claim 1, wherein the communications network is a vehicle electrical system of a vehicle, a vehicle central computer is used as the computing system, and a zone control unit is used as an intermediate control unit of the at least one intermediate control unit.

7. A communications network, comprising: a computing system including a processor and a memory; at least one intermediate control unit; and at least one execution unit associated with each intermediate control unit;
    wherein the at least one intermediate control unit being communicatively connected to the computing system using a first communication system;
    wherein each of the at least one execution unit being communicatively connected to the associated intermediate control unit using a second communication system, which is a master-slave communication system, and is configured as a slave;
    wherein a message configuration table for each second communication system is stored in the computing system, the message configuration table indicating a temporal sequence of data to be transmitted on the second communication system; and
    wherein the communications network is configured in such a way that for a communication with one of the execution units, data are sent from the computing system, via the associated intermediate control unit, to the execution unit using the associated second communication system according to the associated message configuration table for the associated second communication system,
    wherein an operating mode configuration table for each of the at least one second communication system is stored in the associated intermediate control unit, the operating mode configuration table specifying wakeup authorizations for the second communication system and checking thereof.

8. The communications network as recited in claim 7, wherein the data to be sent from the computing system to the execution unit are transferred, together with a transmission time, to the associated intermediate control unit, and are sent by the computing system at the transmission time as transmission data to the execution unit.

9. A computing system including a processor and a memory for use in a communications network that includes the computing system, at least one intermediate control unit, and at least one execution unit associated with each intermediate control unit, the at least one intermediate control unit being communicatively connected to the computing system using a first communication system, each of the at least one execution unit being communicatively connected to the associated intermediate control unit using a second communication system, which is a master-slave communication system, and is configured as a slave, a message configuration table for each second communication system is stored in the computing system, the message configuration table indicating a temporal sequence of data to be transmitted on the second communication system,
    wherein the computing system is configured in such a way that for a communication with one of the execution units, data are sent from the computing system, via the associated intermediate control unit, to the execution unit using the associated second communication according to the associated message configuration table for the associated second communication system,
    wherein an operating mode configuration table for each of the at least one second communication system is stored in the associated intermediate control unit, the operating mode configuration table specifying wakeup authorizations for the second communication system and checking thereof.

10. A method for configuring a communications network including a computing system, at least one intermediate control unit, and at least one execution unit associated with each intermediate control unit, each of the at least one intermediate control unit being communicatively connected to the computing system using a first communication system, each of the at least one execution unit being communicatively connected to the associated intermediate control unit using a second communication system, which is a master-slave communication system, and is used as a slave, a message configuration table for each second communication system is stored in the computing system, the message configuration table indicating a temporal sequence of data to be transmitted on the second communication system, the method comprising:
    configuring the communications network in such a way that for a communication with one of the execution units, data are sent from the computing system, via the associated intermediate control unit, to the execution unit via the associated second communication network according to the associated message configuration table for the associated second communication network,
    wherein an operating mode configuration table for each of the at least one second communication system is stored in the associated intermediate control unit, the operating mode configuration table specifying wakeup authorizations for the second communication system and checking thereof.

11. The method as recited in claim 10, wherein the communications network is a vehicle electrical system of a vehicle, a vehicle central computer is used as the computing system, and a zone control unit is used as an intermediate control unit of the at least one intermediate control unit.

12. The method as recited in claim 1, wherein the at least intermediate control unit is connected to the computing system via a first wired communication link, and wherein the at least one intermediate control unit is connected to the associated at least one execution unit via a second wired communication link.

13. The communications network as recited in claim 7, wherein the at least intermediate control unit is connected to the computing system via a first wired communication link, and wherein the at least one intermediate control unit is connected to the associated at least one execution unit via a second wired communication link.

14. The computing system as recited in claim 9, wherein the at least intermediate control unit is connected to the computing system via a first wired communication link, and wherein the at least one intermediate control unit is connected to the associated at least one execution unit via a second wired communication link.

15. The method as recited in claim 10, wherein the at least intermediate control unit is connected to the computing system via a first wired communication link, and wherein the at least one intermediate control unit is connected to the associated at least one execution unit via a second wired communication link.

* * * * *